(12) United States Patent
Lee et al.

(10) Patent No.: US 8,437,562 B2
(45) Date of Patent: May 7, 2013

(54) INTRA-PREDICTION MODE OPTIMIZATION METHODS AND IMAGE COMPRESSION METHODS AND DEVICES USING THE SAME

(75) Inventors: I-Hsien Lee, Hsinchu (TW); Yu-Min Wu, Tainan (TW); Wen-Hao Chung, Taipei County (TW)

(73) Assignee: Industrial Technology Institute, Hsinchu (TW)

( * ) Notice: Subject to any disclaimer, the term of this patent is extended or adjusted under 35 U.S.C. 154(b) by 350 days.

(21) Appl. No.: 12/952,227

(22) Filed: Nov. 23, 2010

(65) Prior Publication Data

US 2011/0305401 A1 Dec. 15, 2011

(30) Foreign Application Priority Data

Jun. 11, 2010 (TW) ................................ 99119023 A

(51) Int. Cl.
*G06K 9/36* (2006.01)
(52) U.S. Cl.
USPC ........... 382/238; 382/232; 382/233; 382/246; 382/250; 382/251; 375/240.01; 375/240.03
(58) Field of Classification Search .................. 382/232, 382/233, 245, 246, 236, 238, 250, 251, 253; 375/240.01, 240.03, 240.12, 240.16, 240.24, 375/240.26
See application file for complete search history.

(56) References Cited

U.S. PATENT DOCUMENTS

| | | | |
|---|---|---|---|
| 8,208,547 B2 * | 6/2012 | Haskell et al. ............ | 375/240.15 |
| 2005/0163216 A1 * | 7/2005 | Boon et al. ................ | 375/240.12 |
| 2007/0206681 A1 | 9/2007 | Xin et al. | |
| 2010/0046621 A1 * | 2/2010 | Horiuchi et al. .......... | 375/240.12 |
| 2010/0166327 A1 * | 7/2010 | Goel ............................. | 382/236 |

OTHER PUBLICATIONS

An-Chao Tsai et al., "A Simple and Robust Direction Detection Algorithm for Fast H.264 Intra Prediction", ICME 2007, pp. 1587-1590.
Feng Pan et al., "Fast Mode Decision Algorithm for Intraprediction in H.264/AVC Video Coding", IEEE Transactions on Circuits and Systems for Video Technology, vol. 15, No. 7, Jul. 2005, pp. 813-822.
Guifen Tian et al., "An Efficient Fast Mode Decision Algorithm for H.264/AVC Intra Prediction", 2008 Congress on Image and Signal Processing, IEEE Computer Society, pp. 411-415.
Jhing-Fa Wang et al., "A Novel Fast Algorithm for Infra Mode Decision in H.264/AVC Encoders", ISCAS 2006, pp. 3498-3501.
Yu-Wen Huang et al., "Analysis, Fast Algorithm, and VLSI Architecture Design for H.264/AVC Intra Frame Coder", IEEE Transactions on Circuits and Systems for Video Technology, vol. 15, No. 3, Mar. 2005, pp. 378-401.

* cited by examiner

*Primary Examiner* — Ali Bayat
(74) *Attorney, Agent, or Firm* — Birch, Stewart, Kolasch & Birch, LLP

(57) ABSTRACT

An intra-prediction mode optimization method and image compression method/device are disclosed. To properly determine an intra-prediction mode for a target block of an image, a control block is selected from reference blocks of the target block, and an intra-prediction mode adopted in the control block is regarded as a control mode. Assuming that the target block is encoded according to the control mode as well, the prediction efficiency of the target and control blocks is assessed. When the intra-prediction efficiency, under the control mode, of the target block is better than that of the control block, the control mode is determined to be the intra-prediction mode of the target block and an intra-prediction pattern of the target block can be obtained. Otherwise, another one of the reference blocks is selected to be the control block and the control mode is refreshed, to repeat the intra-prediction efficiency assessment.

19 Claims, 8 Drawing Sheets

INTRA-PREDICTION MODE OPTIMIZATION METHODS AND IMAGE COMPRESSION METHODS AND DEVICES USING THE SAME

CROSS REFERENCE TO RELATED APPLICATIONS

This Application claims priority of Taiwan Patent Application No. 099119023, filed on Jun. 11, 2010, the entirety of which is incorporated by reference herein.

BACKGROUND OF THE INVENTION

1. Field of the Invention

The present invention relates to image compression methods, and in particular relates to intra-prediction mode optimization methods adopted in image compression.

2. Description of the Related Art

During the encoding/decoding procedure, the relevance between successive images is taken into consideration (e.g. motion estimation compensation) while the space relevance of pixels of one single image is taken into consideration (e.g. intra prediction encoding) as well.

This specification, is focused on intra-prediction encoding techniques.

FIG. 1 illustrates a block diagram depicting the concept of intra-prediction encoding. When the encoder receives an image 102 (of original data), it delivers the image 102 to an intra-prediction encoding module 104 to generate an intra-prediction image 106. A subtractor 108 outputs a residual image 110 based on the difference between the image 102 and the intra-prediction image 106. The residual image 110 is compressed by a data compression module 112 and thereby compressed data 114 is generated.

In the H.264 standard, various intra-prediction mode candidates are provided. From the intra-prediction mode candidates, the intra-prediction encoding module 104 selects the suitable intra-prediction mode for each block of the image 102, and encodes every block, accordingly. For intra-prediction encoding, it is expected that the intra-prediction image 106 will be similar to the image 102, such that the content of the residual image 110 is simple and no complex features are contained therein. Thus, the quantity of the compressed data 114 is considerably reduced.

H.264 is a highly-compressed digital video encoding/decoding standard. FIG. 2 shows a kind of method an image is intra-prediction encoded. One image 200 is divided into a plurality of Macroblcks, with a size of 16×16 pixels. During the intra-prediction encoding procedure, the Macroblocks in the first row are encoded from left to right. After the Macroblocks of the first row are all encoded, Macroblocks of the next row are encoded from left to right. The rows of Macroblocks are intra-prediction encoded one by one until the intra-prediction encoding of the entire image is finished. The currently encoded Macroblock may be regarded as a target Macroblock. The encoding of the target Macroblock is generally based on the encoding result of reference Macroblocks which are adjacent to the target block and have been encoded. In FIG. 2, the Macroblock MBi,j is regarded as the target Macroblock, and the oblique region includes Macroblocks that have been encoded. Macroblocks MBi,j−1, MBi−1,j−1, MBi−1 j, MBi−1 j+1, which are adjacent to the target Macroblock MBi,j and have been encoded, are regarded as the reference Macroblocks. The encoding of the target Macroblock MBi,j is based on the encoding result of the reference Macroblocks MBi,j−1, MBi−1 j−1, MBi−1 j, MBi−1 j+1.

For the intra-prediction encoding procedure, the encoding size is not limited to 16×16 pixels (the size of one Macroblocks). Instead, one Macroblock may be further divided into blocks of smaller sizes and each block requires one separate intra-prediction encoding procedure. For different encoding sizes, the H.264 standard provides different options to determine the intra-prediction mode. For example, when the encoding size is one Macroblock (16×16 pixels), four candidates are provided for determining the intra-prediction mode. When one Macroblock is further divided into four blocks each includes 8×8 pixels, wherein 9 intra-prediction mode candidates are provided for each 8×8 block. For another case wherein one Macroblock is divided into 16 blocks, each includes 4×4 pixels, wherein another 9 intra-prediction mode candidates are provided for every 4×4 block.

FIG. 3 shows the 9 intra-prediction mode candidates for one 8×8 block. As shown, the target block contains 8×8 pixels. The intra-prediction encoding result of reference blocks adjacent to the target block are taken into consideration in different directions when different intra-prediction modes, Mode 0, Mode 1 and Mode 3 . . . Mode 8, are adopted in the intra-prediction encoding procedure of the target block. In Mode 2, an average calculation is performed on the intra-prediction encoding result of the adjacent pixels, and the calculated average is applied in the intra-prediction encoding of the target block. As for the blocks of other size (16×16 pixels or 4×4 pixels), several intra-prediction mode candidates have been introduced in the H.264 standard, but they are not further discussed here.

One image can be divided into a plurality of Macroblocks, each containing 16×16 pixels, wherein each Macroblock may be further divided into a plurality of blocks each containing 8×8 pixels or 4×4 pixels, and each intra-prediction encoding size refers to a set of candidates for determining the intra-prediction mode therein. Therefore, it usually takes a long period of time to obtain the best intra-prediction encoding proposal for one image (for example, to obtain the most suitable intra-prediction size to divide the image and to obtain the most suitable intra-prediction mode for each divided block). It is an important issue to obtain the best intra-prediction encoding proposal in a short period of time.

BRIEF SUMMARY OF THE INVENTION

Intra-prediction mode optimization methods, image compression devices, and image encoding techniques using the disclosed intra-prediction mode optimization methods are provided.

The disclosed intra-prediction optimization method is applied in determining an intra-prediction mode of a target block of an image. An intra-prediction pattern of the target block is obtained according to the determined intra-prediction mode. In an embodiment, the intra-prediction mode optimization method comprises selecting a control block from reference blocks of the target block, regarding an intra-prediction mode adopted in the control block as a control mode, and assessing intra-prediction efficiency, under the control mode, of the control block and the target block. When the intra-prediction efficiency, under the control mode, of the target block is assessed to be better than that of the control block, the control mode is determined to be the intra-prediction mode of the target block and is used in obtaining the intra-prediction pattern of the target block. When the assessment shows that the intra-prediction efficiency, under the control mode, of the target block is worse than that of the control block, another one of the reference blocks is selected to be the control block and the control mode is refreshed, accordingly and the step of assessing intra-prediction efficiency is repeated.

When all of the reference blocks have been tested to be the control block but there is still no result in determining the intra-prediction mode of the target block, the intra-prediction optimization method may further determine image directivity of an original pattern of the target block to determine the intra-prediction mode of the target block, accordingly, to obtain the intra-prediction pattern of the target block.

In another embodiment, when all of the reference blocks have been tested to be the control block but there is still no result in determining the intra-prediction mode of the target block, the intra-prediction optimization method may further assess intra-prediction efficiency of the target block by referring to untested ones of intra-prediction mode candidates and then determine that the intra-prediction mode candidate, providing the best intra-prediction efficiency, is the intra-prediction mode of the target block, to obtain the intra-prediction pattern of the target block, accordingly.

To speed up the intra-prediction efficiency assessing step, in some embodiments, the assessed intra-prediction efficiency of the target block is temporarily stored, so that the stored data may be referred to during the intra-prediction efficiency assessing steps of the intra-prediction mode optimization of the other blocks.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description show several embodiments carrying out the invention. This description is made for the purpose of illustrating the general principles of the invention and should not be taken in a limiting sense. The scope of the invention is best determined by reference to the appended claims.

Figure 1:
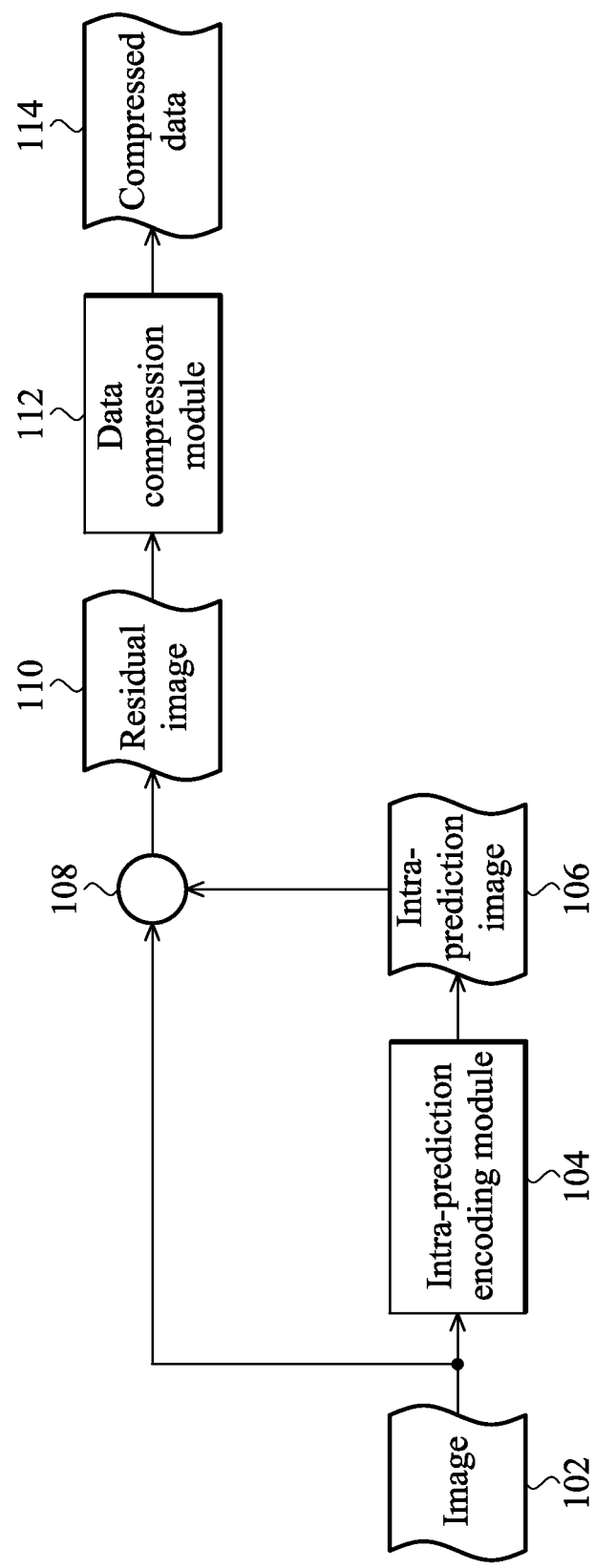
FIG. 1 illustrates a block diagram depicting the concept of intra-prediction encoding.
Figure 2:
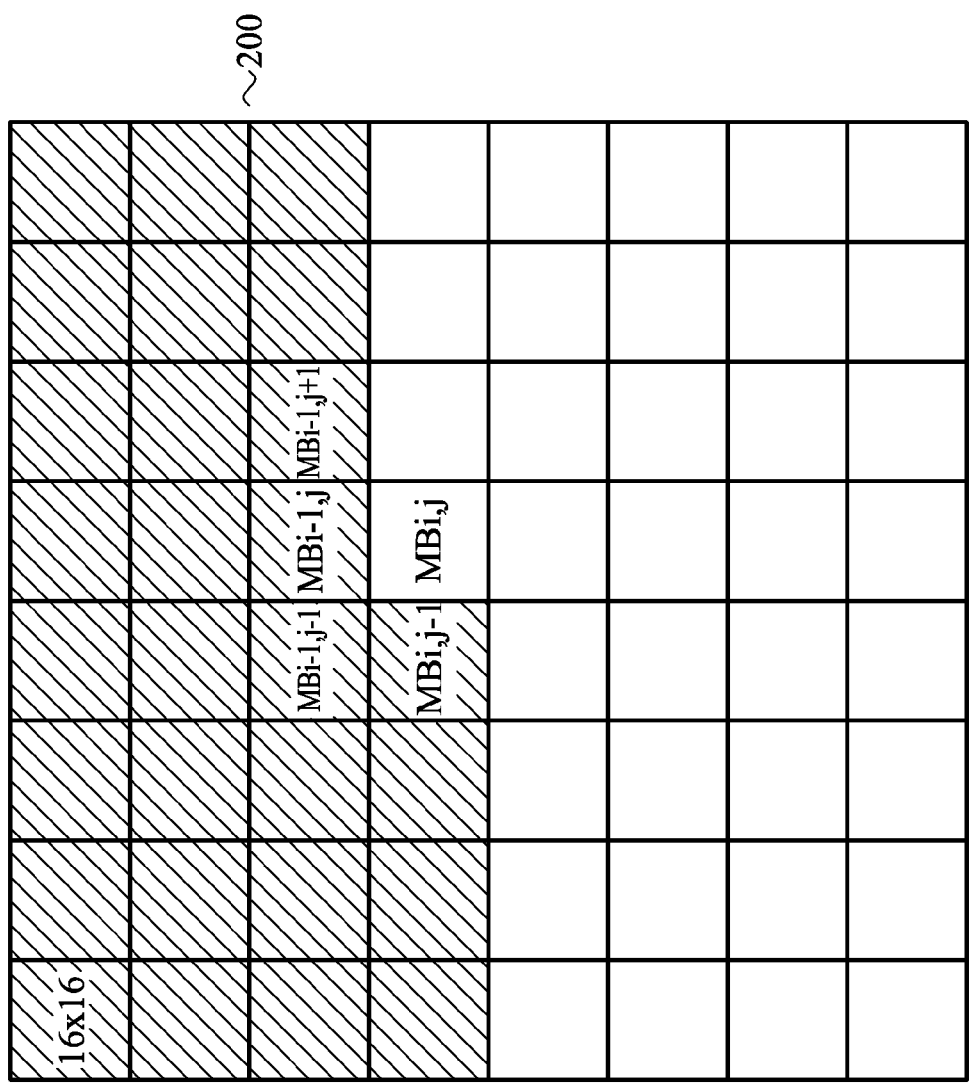
FIG. 2 shows how an image is intra-prediction encoded.
Figure 3:
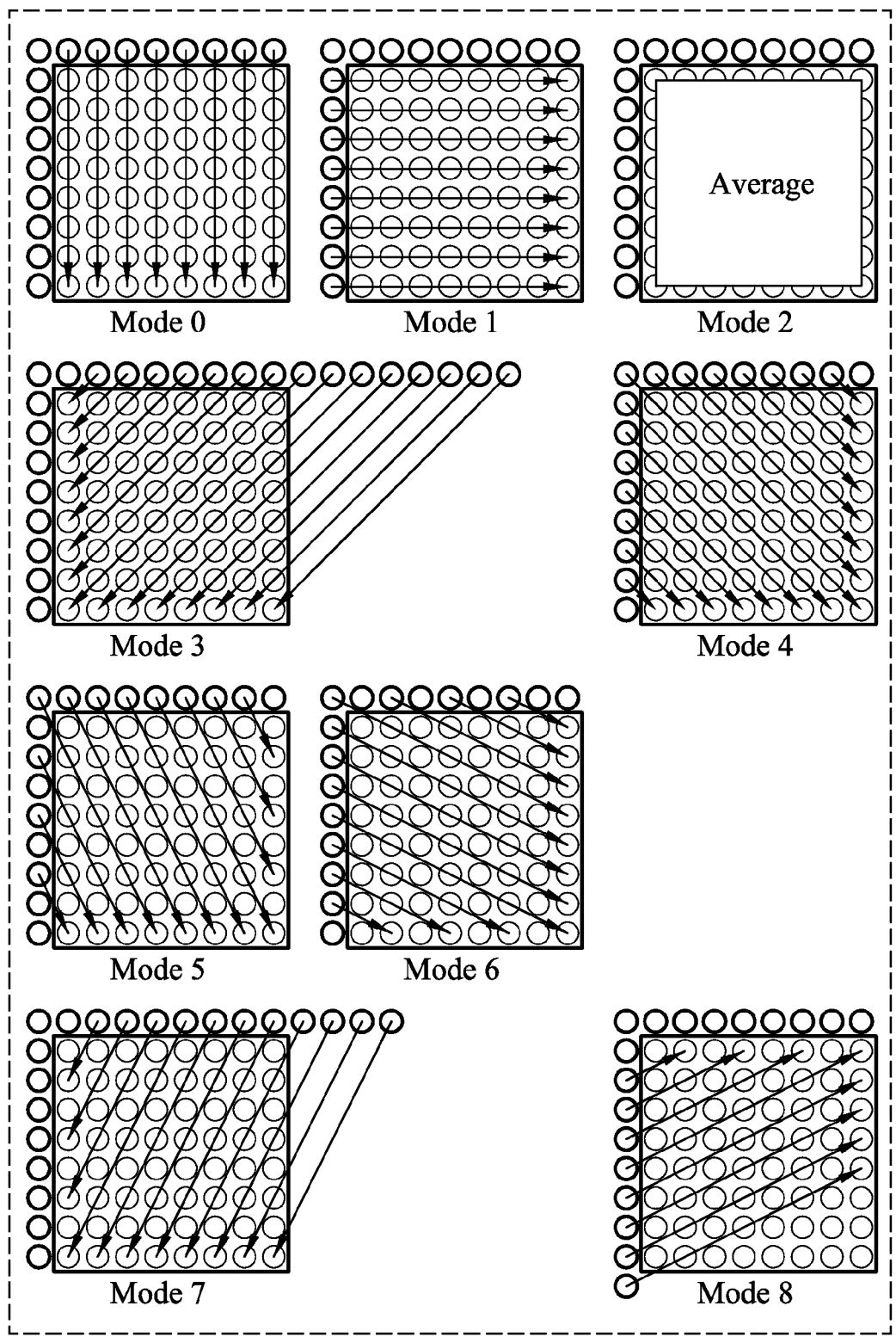
FIG. 3 shows the nine intra-prediction mode candidates for one 8×8 block.
Figure 4:
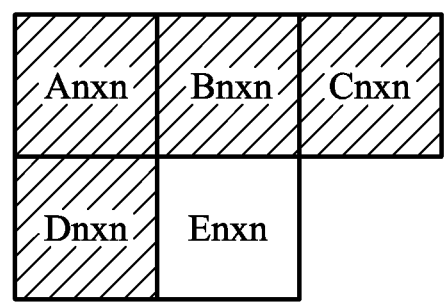
FIG. 4 shows five blocks of an image.

FIG. 4 shows 5 blocks of an image. The five blocks An×n, Bn×n, Cn×n, Dn×n and En×n are of identical size. The block size, n×n pixels, is the intra-prediction encoding size. The value of n may be 16 when the encoding size equals to the size of a Macroblock. The vale of n may be 8 when each Macroblock is divided into four blocks of 8×8 pixels. The value of n may be 4 when the each Macroblock is divided into sixteen blocks of 4'4 pixels. Block En×n is the target block to be intra-prediction encoded. Blocks An×n . . . Dn×n are reference blocks of the target block En×n, which are adjacent to the target block En×n and have been encoded (marked by slashes). The intra-prediction encoding of the target block En×n is based on the encoding result of the reference blocks An×n . . . Dn×n. To reduce the period of time required in determining the best intra-prediction mode for the target block En×n, intra-prediction mode optimization methods are disclosed in the specification, wherein the intra-prediction modes adopted in the reference blocks are taken into consideration in determining the intra-prediction mode of the target block and a dynamically changed threshold is adopted to determine whether a suitable intra-prediction mode is obtained for the target block En×n.

Figure 5:
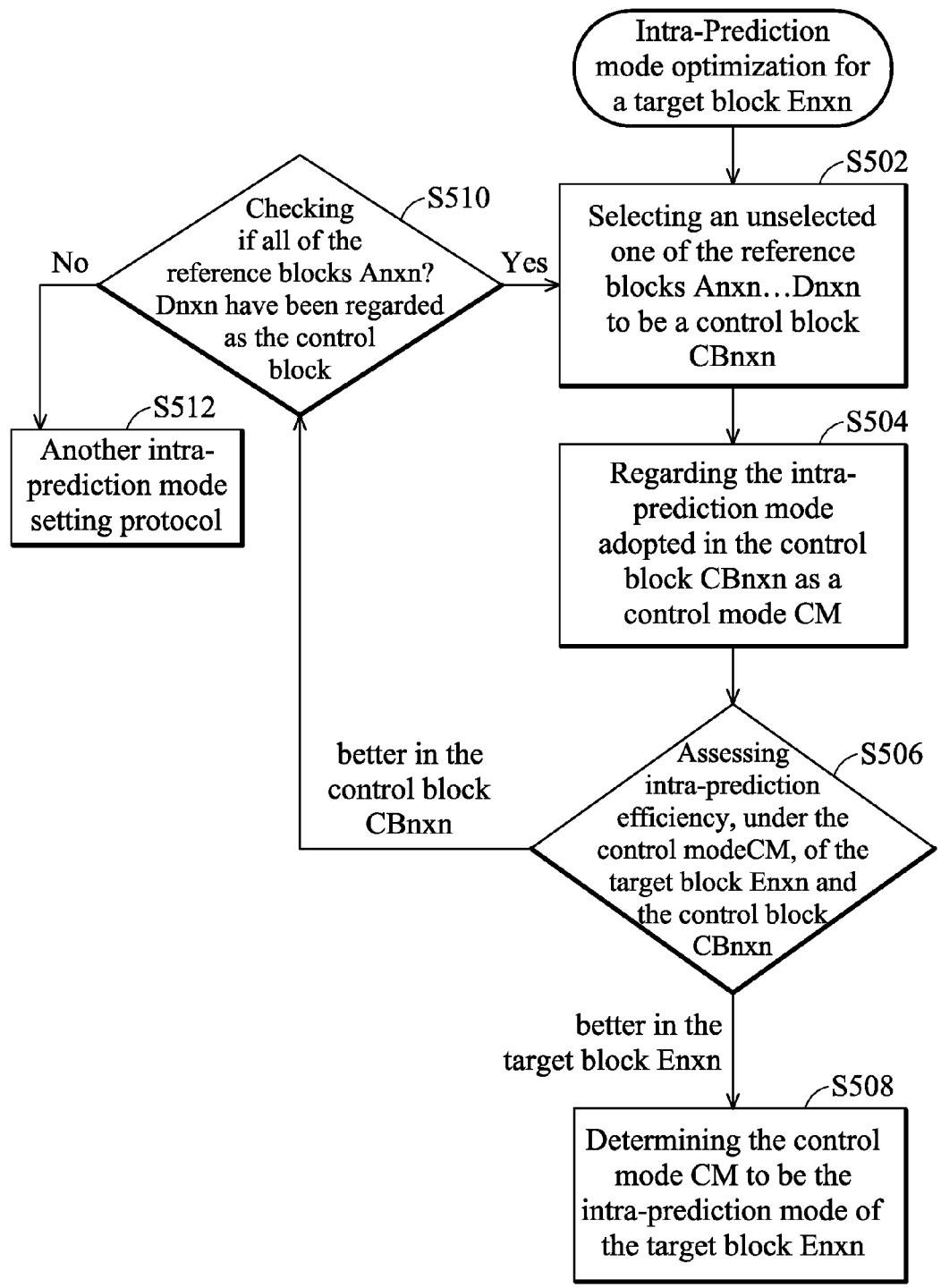
FIG. 5 illustrates a flowchart depicting an intra-prediction mode optimization method for a target block En×n shown in FIG. 4.

FIG. 5 illustrates a flowchart depicting an intra-prediction mode optimization method for a target block En×n shown in FIG. 4. In step S502, a control block, symbolized by CBn×n, is selected from reference blocks An×n . . . Dn×n of the target block En×n. In step S504, the intra-prediction mode adopted in the control block CBn×n is regarded as a control mode and is symbolized by CM. In step S506, an assessment of intra-prediction efficiency of the target block En×n and the control block CBn×n is made, wherein the control mode CM is applied in the target block En×n and the control block CBn×n both, and the intra-prediction efficiency, under the control mode CM, of the target block En×n is compared with that of the control block CBn×n. When the intra-prediction efficiency, under the control mode CM, of the target block En×n is better than that of the control block CBn×xn, step S508 is executed to determine the control mode CM to be the intra-prediction mode of the target block En×n. When the step S506 determines that the intra-prediction efficiency, under the control mode, of the target block En×n is worse than that of the control block CBn×n, another one of the reference blocks An×n . . . Dn×n is selected to be the control block CBn×n, and the setting of the control mode CM is refreshed, accordingly, and the assessing step S506 is repeated. For example, when the assessing step S506 determines that the intra-prediction efficiency of the control block CBn×n is better than the intra-prediction efficiency, under the control mode CM, of the target block En×n, step S510 is executed to check if all of the reference blocks An×n . . . Dn×n have been regarded as the control block CBn×n. If any of the reference blocks Anxn . . . Dnxn is untested, steps S502, S504 and S506 are repeated, to refresh the control block CBnxn and the control mode CM, and to execute the intra-efficiency assessing step S506.

In a case wherein the image is smooth and simple, the intra-prediction mode of at least one of the reference blocks An×n . . . Dn×n is good enough to pass the assessment of step S506 and be reused as the intra-prediction mode of the target block En×n. In another case wherein the image is complex and contains a large number of features, maybe the intra-prediction modes of all reference blocks An×n . . . Dn×n are unsuitable for the target block En×n and thus, other solutions are required to obtain a reasonable intra-prediction mode for the target block En×n. For example, the determining step S510 of FIG. 5 is provided to allow another intra-prediction mode setting protocol (of block S512) to be introduced into the intra-prediction mode optimization process.

In an embodiment, the intra-prediction mode setting protocol (of block S512) assesses an intra-prediction efficiency of the target block En×n by referring to untested ones (those not adopted in the reference blocks An×n . . . Dn×n) of intra-prediction mode candidates. According to the assessment, the intra-prediction mode candidate providing the best intra-prediction efficiency is determined to be the intra-prediction mode of the target block En×n and the intra-prediction pattern of the target block En×n is obtained, accordingly.

In another embodiment, the intra-prediction mode setting protocol S512 may analyze the image directivity of the original pattern of the target block En×n and determine the intra-prediction mode, accordingly, to obtain the intra-prediction pattern of the target block En×n. The image directivity analysis may be realized by any edge detection technique introduced in the intra-prediction encoding field of the H.264 encoding/coding technique. In some embodiments, the edge detection filter may obtain several possible intra-prediction modes first, and then determine that the one, providing the best intra-prediction efficiency, is the intra-prediction mode of the target block En×n.

In this paragraph, the assessing step S506 is discussed. The intra-prediction efficiency may be defined based on a SAD (sum of absolute difference) calculation, wherein the difference between an intra-prediction pattern and an original pattern is quantitated. The calculated SAD, under the control mode CM, of the target block En×n is compared with the calculated SAD, under the control mode CM, of the control block CBn×n. The lower the calculated SAD, the better the intra-prediction efficiency.

In another embodiment, the difference between an intra-prediction pattern and an original pattern is quantitated by a SATD (sum of absolute transformed difference) calculation. The SATD calculation is applied in the intra-prediction efficiency assessing step S506. The calculated SATD, under the control mode CM, of the target block En×n is compared with the calculated SATD, under the control mode CM, of the control block CBn×n. The lower the calculated SATD, the better the intra-prediction efficiency.

The specification further provides another embodiment, wherein the intra-prediction efficiency, calculated in step S506, of the target block En×n is temporarily stored in advance to the step S508. In this regard, during the succeeding intra-prediction mode optimization of other blocks, the intra-prediction efficiency of the reference blocks are already known, and the computation load is considerably reduced.

To summarize, for the intra-prediction optimization of the invention, there are two important features: taking the intra-prediction modes adopted in the reference blocks (e.g. An×n . . . Dn×n) into consideration first when determining the intra-prediction mode of the target block (e.g. En×n); and using a dynamically changed threshold to pick out the suitable intra-prediction mode for the target block (e.g. En×n). In the following, the disclosed dynamically changed threshold is especially discussed. Instead of being compared with a fixed threshold value, the intra-prediction efficiency, under the control mode CM, of the target block is compared with a dynamically changed threshold—the intra-prediction efficiency, under the control mode CM, of the control block CBn×n. By having a dynamically changed threshold, the bit rate, image damage and computation quantity of the intra-prediction encoding technique may be considerably improved. The improvements are obvious for simple images with uncomplicated features as well as complex image with complicated features.

Figure 6:
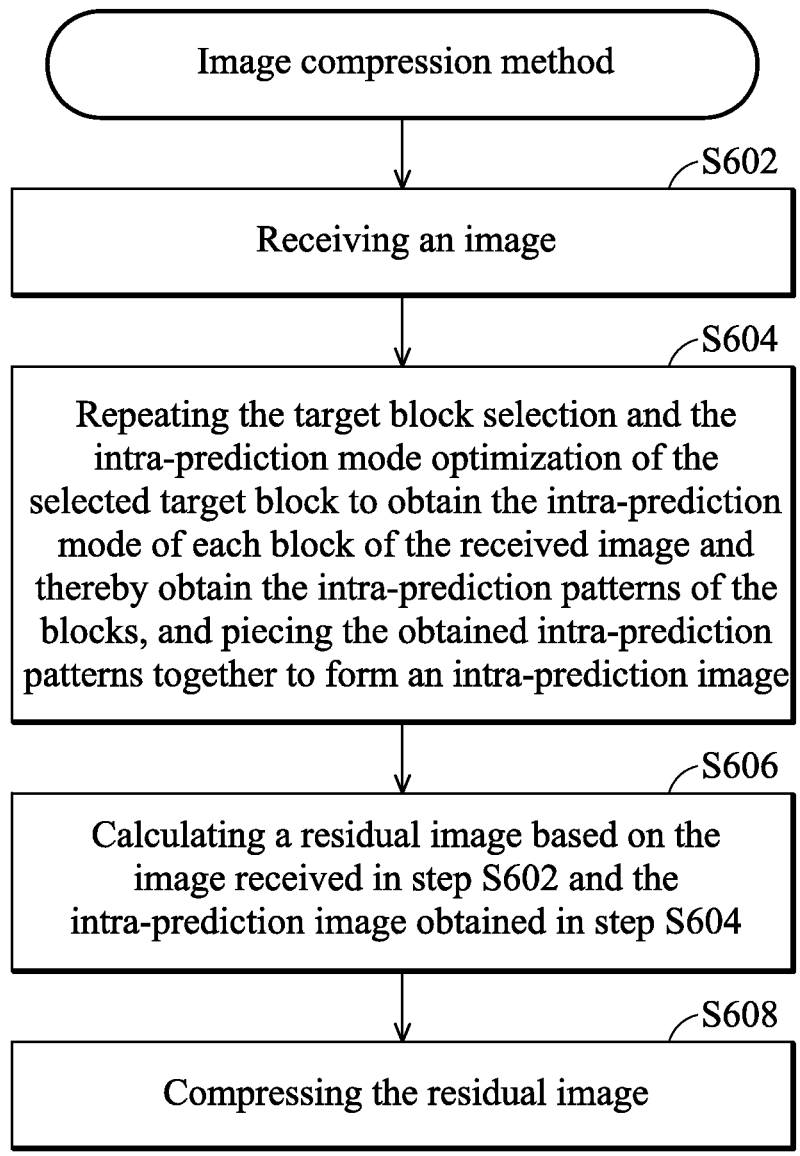
FIG. 6 illustrates a flowchart depicting an embodiment of the disclosed image compression methods.
Figure 7:
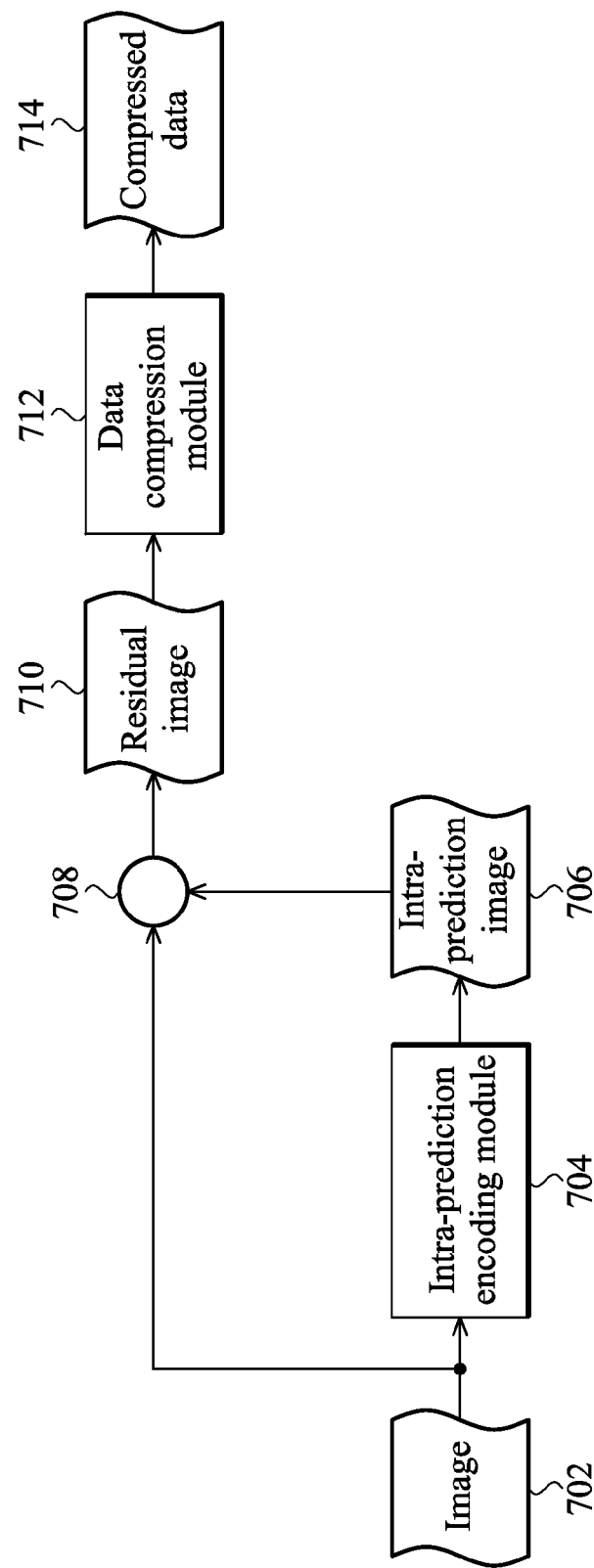
FIG. 7 illustrates a block diagram depicting a framework for image compression.

FIG. 6 illustrates a flowchart depicting an embodiment of the disclosed image compression methods, which may be realized in the framework of FIG. 7 and may utilize the intra-prediction mode optimization method of FIG. 5. For image compression, an image, 702 of FIG. 7, may be received in step S602 of FIG. 6. The intra-prediction encoding module 704 receives the image 702 and determines which block of the image is the target block to be encoded, and, the intra-prediction mode optimization method of FIG. 5 is performed to determine the intra-prediction mode of the target block and thereby obtain the intra-prediction pattern of the target block. The aforementioned target block determination, intra-prediction mode optimization, and intra-prediction pattern generation are repeated until every block of the entire image 702 is encoded and, in step S604, the generated intra-prediction patterns are pieced together to form an intra-prediction image 706. The subtractor 708 generates a residual image 710 based on the difference between the infra-prediction image 706 and the image 702 (referring to step S606). In the end, the image compression module 712 compresses the residual image 710 into compressed data 714 (referring to step S608).

Figure 8:
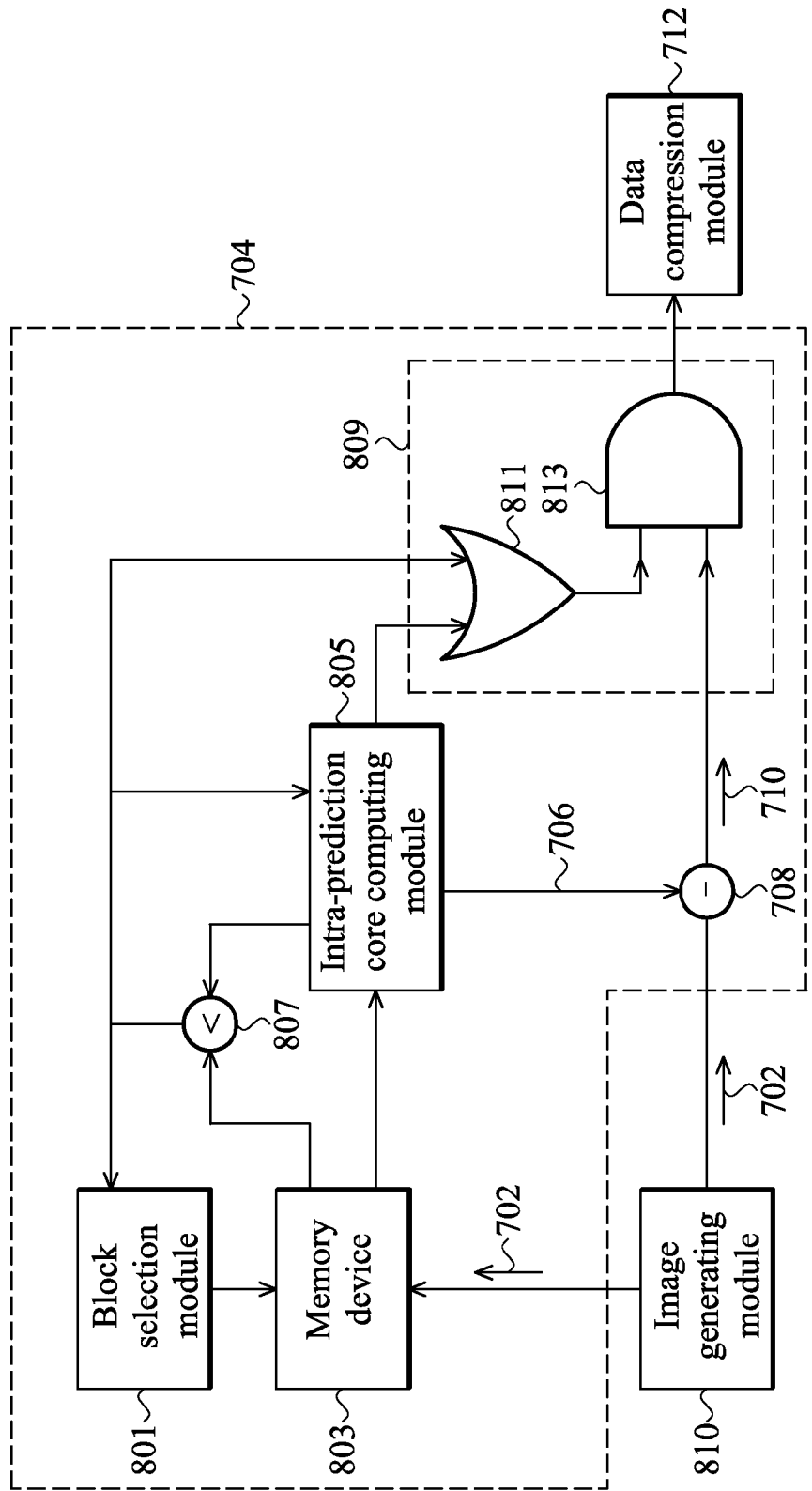
FIG. 8 illustrates a block diagram depicting another framework for image compression, wherein the intra-prediction encoding module 704 is discussed in detail in comparison with that of FIG. 7.

To further discuss the details of the intra-prediction encoding module 704 of FIG. 7, FIG. 8 is provided. As shown, the intra-prediction encoding module 704 comprises a block selection module 801, a memory device 803, an intra-prediction core computing module 805, a comparator 807 and a logic device 809. When receiving a logic low signal, the block selection module 801 selects one of the reference blocks An×n . . . Dn×n to be the control block CBn×n. The memory device 803 is stored with the intra-prediction modes adopted in the reference blocks An×n . . . En×n (of various encoding size, i.e. n is a variable) and the intra-prediction efficiencies corresponding thereto. The memory device 803 is further stored with the pixel information of the image 702. The intra-prediction core computing module 805 assesses the intra-prediction efficiency, under the control mode CM, of the target block En×n. The intra-prediction core computing module 805 may perform an SAD or SATD calculation to assess the intra-prediction efficiency. After the intra-prediction mode of the target block En×n is determined, the intra-prediction efficiency (under the determined intra-prediction mode) of the target block En×n may be stored to the memory device 803 to be accessed in the subsequent intra-prediction mode optimization procedures of the remaining blocks.

The comparator 807 compares the intra-prediction efficiency, under the control mode CM, of the target block En×n and the control block CBn×n. When the intra-prediction efficiency, under the control mode CM, of the target block En×n is determined to be better than that of the control block CBn×n, the comparator 807 outputs a logic high signal to instruct the intra-prediction core computing module 805 to determine the control mode CM as the intra-prediction mode of the target block En×n. When the intra-prediction efficiency, under the control mode CM, of the target block En×n is not better than that of the control block CBn×n, the comparator 807 outputs a logic low signal to instruct the block selection module 801 to select another one of the reference blocks An×n . . . Dn×n to be the control block CBn×n and to refresh the control mode CM accordingly. According to the refreshed control mode CM, the intra-prediction core computing module 805 assesses the intra-prediction efficiency of the target block En×n. It has to be noted that in this embodiment, when any of the reference blocks An×n . . . Dn×n has not been selected to be the control block CBn×n and the comparator 807 has not output a logic high signal to represent that the control mode CM provides a better intra-prediction efficiency in the target block En×n than in the control block CBn×n, the block selector 801 selects one of the unselected reference blocks to be the control block CBn×n and the control mode CM is refreshed, accordingly.

When all of the reference blocks An×n . . . Dn×n have been tested to be the control block CBn×n and no suitable control mode CM is obtained to make the intra-prediction efficiency of the target block En×n to be better than that of the control block CBn×n, the intra-prediction core computing module 805 adopts the untested ones (those not adopted in the reference blocks An×n . . . Dn×n) of intra-prediction mode candidates to test the intra-prediction efficiency of the target block En×n, and asserts the intra-prediction mode candidate, providing the best intra-prediction efficiency, as the intra-prediction mode of the target block En×n to obtain the intra-prediction pattern of the target block En×n accordingly. Meanwhile, the intra-prediction core computing module 805 further outputs a logic high enable signal. The obtained intra-prediction pattern of every block of an image may be collected to form the intra-prediction image 706. The image 702 may be provided by the image generating module 810. By the subtractor 708, the residual image 710 is generated based on the difference between the intra-prediction image 706 and the image 702. The generated residual image 710 is transmitted to the logic device 809.

The logic device 809 comprises an OR gate 811 and an AND gate 813. When receiving the logic high enable signal from the intra-prediction core computing module 805 or the logic high signal from the comparator 807, the OR gate 811 outputs a logic high signal to the AND gate 813. The residual image 710 is transmitted into the AND gate 813 and, when the logic high signal from the OR gate 811 is received, the AND gate 813 outputs the residual image 710 to the data compression module 712 to be compressed into compressed data.

In other embodiments, variants of the aforementioned intra-prediction mode optimization and image compression techniques are provided. For instance, between the steps disclosed in the flowchart of FIG. 6, image processing techniques known by those skilled in the art may be inserted to improve the performance of the intra-prediction optimization and the image compression. Therefore, the scope of the appended claims should be accorded the broadest interpretation so as to encompass all such modifications and similar arrangements.

What is claimed is:

1. A method for intra-prediction mode optimization, determining an intra-prediction mode of a target block of an image to obtain an intra-prediction pattern of the target block, comprising:
   selecting a control block from reference blocks of the target block;
   regarding an intra-prediction mode adopted in the control block as a control mode; and
   assessing intra-prediction efficiency, under the control mode, of the control block and the target block, wherein:
      when the intra-prediction efficiency, under the control mode, of the target block is better than that of the control block, the control mode is determined to be the intra-prediction mode of the target block, to obtain the intra-prediction pattern of the target block, accordingly;
      when the intra-prediction efficiency of the control block is better than the intra-prediction efficiency, under the control mode, of the target block, another one of the reference blocks is selected to be the control block and the control mode is refreshed, accordingly, and the step of assessing the intra-prediction efficiency is repeated.

2. The method as claimed in claim 1, wherein:
   when all of the reference blocks have been tested to be the control block but there is still no result in determining the intra-prediction mode of the target block, the method further determines image directivity of an original pattern of the target block and then determines that the intra-prediction mode of the target block, accordingly, to obtain the intra-prediction pattern of the target block.

3. The method as claimed in claim 1, wherein:
   when all of the reference blocks have been tested to be the control block but there is still no result in determining the intra-prediction mode of the target block, the method further assesses intra-prediction efficiency of the target block by referring to untested ones of intra-prediction mode candidates and then determines that the intra-prediction mode candidate, providing the best intra-prediction efficiency, is the intra-prediction mode of the target block, to obtain the intra-prediction pattern of the target block, accordingly.

4. The method as claimed in claim 1, wherein the step of assessing the intra-prediction efficiency comprises:
   performing a sum of absolute difference calculation in assessing the intra-prediction efficiency, under the control mode, of the target and the control blocks.

5. The method as claimed in claim 1, wherein the step of intra-prediction efficiency assessing comprises:
   performing a sum of absolute transformed difference calculation in assessing the intra-prediction efficiency, under the control mode, of the target and the control blocks.

6. The method as claimed in claim 1, further comprising:
   temporarily storing the intra-prediction efficiency of the target block encoded by the determined intra-prediction mode, wherein the temporarily stored intra-prediction efficiency is referred to during succeeding intra-mode prediction mode optimization of other blocks.

7. An image compression method, comprising:
   receiving an image;
   generating an intra-prediction image for the image;
   regarding a difference between the image and the intra-prediction image as a residual image; and
   compressing the residual image, which is referred to when recovering the image;
   wherein, the step of generating the intra-prediction image further comprises determining an intra-prediction mode of each block of the image, obtaining an intra-prediction pattern for each block in accordance with the determined intra-prediction mode thereof, and piecing up the obtained intra-prediction patterns to form the intra-prediction image,
   wherein, the step determining the intra-prediction mode of each block further comprises:
      regarding the block to be encoded as a target block and selecting a control block from reference blocks of the target block;
      regarding the intra-prediction mode adopted in the control block as a control mode; and
      assessing intra-prediction efficiency, under the control mode, of the target block and the control block, wherein:
         when the intra-prediction efficiency, under the control mode, of the target block is better than that of the control block, the control mode is determined to be the intra-prediction mode of the target block, to obtain the intra-prediction pattern of the target block, accordingly;
         when the intra-prediction efficiency of the control block is better than the intra-prediction efficiency, under the control mode, of the target block, another one of the reference blocks is selected to be the control block and the control mode is refreshed, accordingly, and the step of assessing the intra-prediction efficiency is repeated.

8. The method as claimed in claim 7, wherein:
when all of the reference blocks of the target block that is to be encoded have been tested to be the control block but there is still no result in determining the intra-prediction mode of the target block, the method further determines image directivity of an original pattern of the target block and then determines that the intra-prediction mode of the target block, accordingly, to obtain the intra-prediction pattern of the target block.

9. The method as claimed in claim 7, wherein:
when all of the reference blocks of the target block that is to be encoded have been tested to be the control block but there is still no result in determining the intra-prediction mode of the target block, the method further assesses intra-prediction efficiency of the target block by referring to untested ones of intra-prediction mode candidates and then determines that the intra-prediction mode candidate, providing the best intra-prediction efficiency, is the intra-prediction mode of the target block, to obtain the intra-prediction pattern of the target block, accordingly.

10. An image compression device, comprising:
an intra-prediction encoding module, receiving an image, determining an intra-prediction mode for each block of the image and then obtaining an intra-prediction pattern for each block, accordingly, to form an intra-prediction image, wherein, the intra-prediction encoding module determines the intra-prediction mode of each block by regarding the block to be encoded as a target block and selecting a control block from reference blocks of the target block, and regarding the intra-prediction mode adopted in the control block as a control mode, assessing intra-prediction efficiency, under the control mode, of the target block and the control block, wherein, when the intra-prediction efficiency, under the control mode, of the target block is better than that of the control block, the control mode is determined to be the intra-prediction mode of the target block, to obtain the intra-prediction pattern of the target block, accordingly, and, when the intra-prediction efficiency of the control block is better than the intra-prediction efficiency, under the control mode, of the target block, another one of the reference blocks is selected to be the control block and the control mode is refreshed, accordingly and the step of assessing the intra-prediction efficiency is repeated;
a subtractor, generating a residual image based on a difference between the image and the intra-prediction image; and
a data compressing module, compressing the residual image to generate compressed data which is referred to when recovering the image.

11. The image compression device as claimed in claim 10, wherein, when all of the reference blocks of the target block that is to be encoded have been tested to be the control block but there is still no result in determining the intra-prediction mode of the target block, the method further determines image directivity of an original pattern of the target block and then determines the intra-prediction mode of the target block, accordingly, to obtain the intra-prediction pattern of the target block.

12. The image compression device as claimed in claim 10, wherein, when all of the reference blocks of the target block that is to be encoded have been tested to be the control block but there is still no result in determining the intra-prediction mode of the target block, the method further assesses intra-prediction efficiency of the target block by referring to untested ones of intra-prediction mode candidates and then determines that the intra-prediction mode candidate, providing the best intra-prediction efficiency, is the intra-prediction mode of the target block, to obtain the intra-prediction pattern of the target block, accordingly.

13. The image compression device as claimed in claim 10, wherein the intra-prediction module comprises:
a block selection module, selecting one of the reference blocks to be the control block, according to a first comparison signal;
a memory device, stored with the intra-prediction modes of various size of the reference blocks and the intra-prediction efficiency corresponding thereto;
an intra-prediction core computing module, assessing that under the control mode how the intra-prediction efficiency of the target block is, obtaining the intra-prediction pattern of the target block, acceding to the control mode, when the control mode is determined suitable for the target block, wherein, when all of the reference blocks have been tested to be the control block but there is still no result in determining the intra-prediction mode of the target block, the intra-prediction core computing module further assesses intra-prediction efficiency of the target block by referring to untested ones of intra-prediction mode candidates and then determines that the intra-prediction mode candidate, providing the best intra-prediction efficiency, is the intra-prediction mode of the target block, to obtain the intra-prediction pattern of the target block, accordingly, and output an enable signal ;
a comparator, coupled to the memory device and the intra-prediction core computing module, comparing intra-prediction efficiency of the target block and the control block, outputting the first comparison signal when the intra-prediction efficiency of the control block is better than that of the target block, and outputting a second comparison signal when the intra-prediction efficiency of the target block is better than that of the control block; and
a logic device coupled to the subtractor to receive the residual image, and output the received residual image to the data compression module when receiving the enable signal or the second comparison signal.

14. The image compression device as claimed in claim 13, wherein the enable signal is a logic high signal, the first comparison signal is a logic low signal and the second comparison signal is a logic low signal.

15. The image compression device as claimed in claim 14, wherein the logic device comprises:
an OR gate, outputting a logic high signal when receiving the enable signal or the second comparison signal; and
an AND gate, receiving the residual image, and outputting the received residual image to the data compression module when receiving the logic high signal from the OR gate.

16. The image compression device as claimed in claim 13, wherein, when receiving the first comparison signal, the block selection module selects another one of the reference blocks to be the control block and the control mode is refreshed, accordingly.

17. The image compression device as claimed in claim 13, wherein the intra-prediction core computing module further performs a sum of absolute difference calculation in assessing that under the control mode how the intra-prediction efficiency of the target and the control blocks is.

18. The image compression device as claimed in claim 13, wherein the intra-prediction core computing module further performs a sum of absolute transformed difference calculation in assessing that under the control mode how the intra-prediction efficiency of the target and the control blocks is.

19. The image compression device as claimed in claim 13, wherein the intra-prediction efficiency of the target block encoded according to the determined intra-prediction mode is temporarily stored in the memory device.

* * * * *

UNITED STATES PATENT AND TRADEMARK OFFICE
CERTIFICATE OF CORRECTION

PATENT NO. : 8,437,562 B2  Page 1 of 1
APPLICATION NO. : 12/952227
DATED : May 7, 2013
INVENTOR(S) : Lee et al.

It is certified that error appears in the above-identified patent and that said Letters Patent is hereby corrected as shown below:

ON THE TITLE PAGE:

Item [73], Assignee, change "Industrial Technology Institute, Hsinchu (TW)" to --Industrial Technology Research Institute, Hsinchu (TW)--.

Signed and Sealed this
Thirteenth Day of May, 2014

Michelle K. Lee
*Deputy Director of the United States Patent and Trademark Office*